(12) United States Patent
Nakamura et al.

(10) Patent No.: US 9,352,298 B2
(45) Date of Patent: May 31, 2016

(54) METHOD FOR PRODUCING POLYMER PARTICLES, AND POLYMER PARTICLES

(75) Inventors: Satoshi Nakamura, Minato-ku (JP); Tetsuo Fukuta, Minato-ku (JP); Kazuhiro Ikkyu, Minato-ku (JP); Yu Otani, Minato-ku (JP); Hiroshi Kawai, Minato-ku (JP)

(73) Assignee: JSR CORPORATION, Tokyo (JP)

( * ) Notice: Subject to any disclaimer, the term of this patent is extended or adjusted under 35 U.S.C. 154(b) by 554 days.

(21) Appl. No.: 13/994,495

(22) PCT Filed: Dec. 14, 2011

(86) PCT No.: PCT/JP2011/078902
§ 371 (c)(1),
(2), (4) Date: Aug. 13, 2013

(87) PCT Pub. No.: WO2012/081616
PCT Pub. Date: Jun. 21, 2012

(65) Prior Publication Data
US 2013/0316892 A1 Nov. 28, 2013

(30) Foreign Application Priority Data

Dec. 14, 2010 (JP) ................................. 2010-278513
Dec. 14, 2010 (JP) ................................. 2010-278514

(51) Int. Cl.

| | |
|---|---|
| *B01J 20/22* | (2006.01) |
| *B01J 20/281* | (2006.01) |
| *B01J 20/285* | (2006.01) |
| *C08J 3/16* | (2006.01) |
| *C08J 3/24* | (2006.01) |
| *C08B 1/00* | (2006.01) |
| *C08L 1/02* | (2006.01) |
| *C08L 1/28* | (2006.01) |
| *C08L 5/00* | (2006.01) |
| *C08L 5/02* | (2006.01) |
| *C08L 5/08* | (2006.01) |
| *C08L 5/12* | (2006.01) |
| *C08B 15/10* | (2006.01) |
| *C08B 37/00* | (2006.01) |
| *C08B 37/02* | (2006.01) |

(Continued)

(52) U.S. Cl.
CPC .............. *B01J 20/281* (2013.01); *B01J 20/267* (2013.01); *B01J 20/285* (2013.01); *C08B 1/003* (2013.01); *C08B 15/10* (2013.01); *C08B 37/003* (2013.01); *C08B 37/0018* (2013.01); *C08B 37/0021* (2013.01); *C08B 37/0039* (2013.01); *C08J 3/16* (2013.01); *C08J 3/24* (2013.01); *C08L 1/02* (2013.01); *C08L 1/28* (2013.01); *C08L 5/00* (2013.01); *C08L 5/02* (2013.01); *C08L 5/08* (2013.01); *C08L 5/12* (2013.01); *C08J 2301/02* (2013.01); *Y02P 20/542* (2015.11)

(58) Field of Classification Search
CPC ........................................................ B01J 20/22
USPC ........................................................ 502/401
See application file for complete search history.

(56) References Cited

U.S. PATENT DOCUMENTS

| | | | |
|---|---|---|---|
| 4,665,164 | A | 5/1987 | Pernemalm et al. |
| 6,602,990 | B1 | 8/2003 | Berg |

(Continued)

FOREIGN PATENT DOCUMENTS

| | | |
|---|---|---|
| JP | 60 39558 | 3/1985 |
| JP | 3601229 | 10/2004 |

(Continued)

OTHER PUBLICATIONS

Du, Kai-Feng, et al., Preparation and characterization of novel macroporous cellulose beads regenerated from ionic liquid for fast chromatography, Journal of Chromatography A, vol. 1217, pp. 1298 to 1304, (2010).

(Continued)

*Primary Examiner* — Edward Johnson
(74) *Attorney, Agent, or Firm* — Oblon, McClelland, Maier & Neustadt, L.L.P.

(57) ABSTRACT

Provided are polymer particles which can be used at a high flow rate when used as a filler for chromatography, that is, has excellent resistance flow rate appropriate for processing in large quantities, and also has a high binding capacity for target molecules such as proteins when an appropriate ligand is contained in the particles, and a method for producing the polymer particles; specifically, crosslinked polymer particles and a method for producing the crosslinked polymer particles, polysaccharide composite particles and a method for producing the polysaccharide composite particles, a filler for chromatography using the polymer particles, and an adsorbent for antibody purification. Disclosed are: A. a method for producing polysaccharide composite particles, the method including the following steps (1) to (3): (1) a step of preparing a polysaccharide solution, in which two or more kinds of polysaccharides are dissolved in an ionic liquid; (2) a step of preparing a droplet dispersion liquid of the polysaccharide solution, in which liquid droplets of the polysaccharide solution are dispersed in an organic solvent having low compatibility with the ionic liquid; and (3) a coagulation step in which a composite of the polysaccharides are coagulated to obtain the polysaccharide composite particles; and B. a method for producing a crosslinked polymer particle, the method including a step of allowing a polymer dissolved in an ionic liquid, to react with a crosslinking agent while the polymer is subjected to droplet dispersion in an organic solvent having low compatibility with the ionic liquid.

22 Claims, 1 Drawing Sheet

(51) Int. Cl.
*C08B 37/08* (2006.01)
*B01J 20/26* (2006.01)

(56) References Cited

U.S. PATENT DOCUMENTS

| | | |
|---|---|---|
| 2008/0237124 A1 | 10/2008 | Axen et al. |
| 2009/0062118 A1 | 3/2009 | Umeda et al. |
| 2010/0029914 A1 | 2/2010 | Komiya et al. |
| 2011/0301330 A1 | 12/2011 | Matsumoto et al. |

FOREIGN PATENT DOCUMENTS

| | | |
|---|---|---|
| JP | 3663666 | 4/2005 |
| JP | 4081143 | 2/2008 |
| JP | 2008 279366 | 11/2008 |
| JP | 2009 506340 | 2/2009 |
| JP | 2009 242770 | 10/2009 |
| JP | 2010 52986 | 3/2010 |
| WO | 2006 132333 | 12/2006 |
| WO | 2008 133269 | 11/2008 |
| WO | 2010 095673 | 8/2010 |

OTHER PUBLICATIONS

Lin, Chun-xiang, et al., Novel Preparation and Characterization of Cellulose Microparticles Functionalized in Ionic Liquids, Langmuir, vol. 25, No. 17, pp. 10116 to 10120, (2009).

International Search Report Issued Mar. 19, 2012 in PCT/ JP11/ 78902 Filed Dec. 14, 2011.

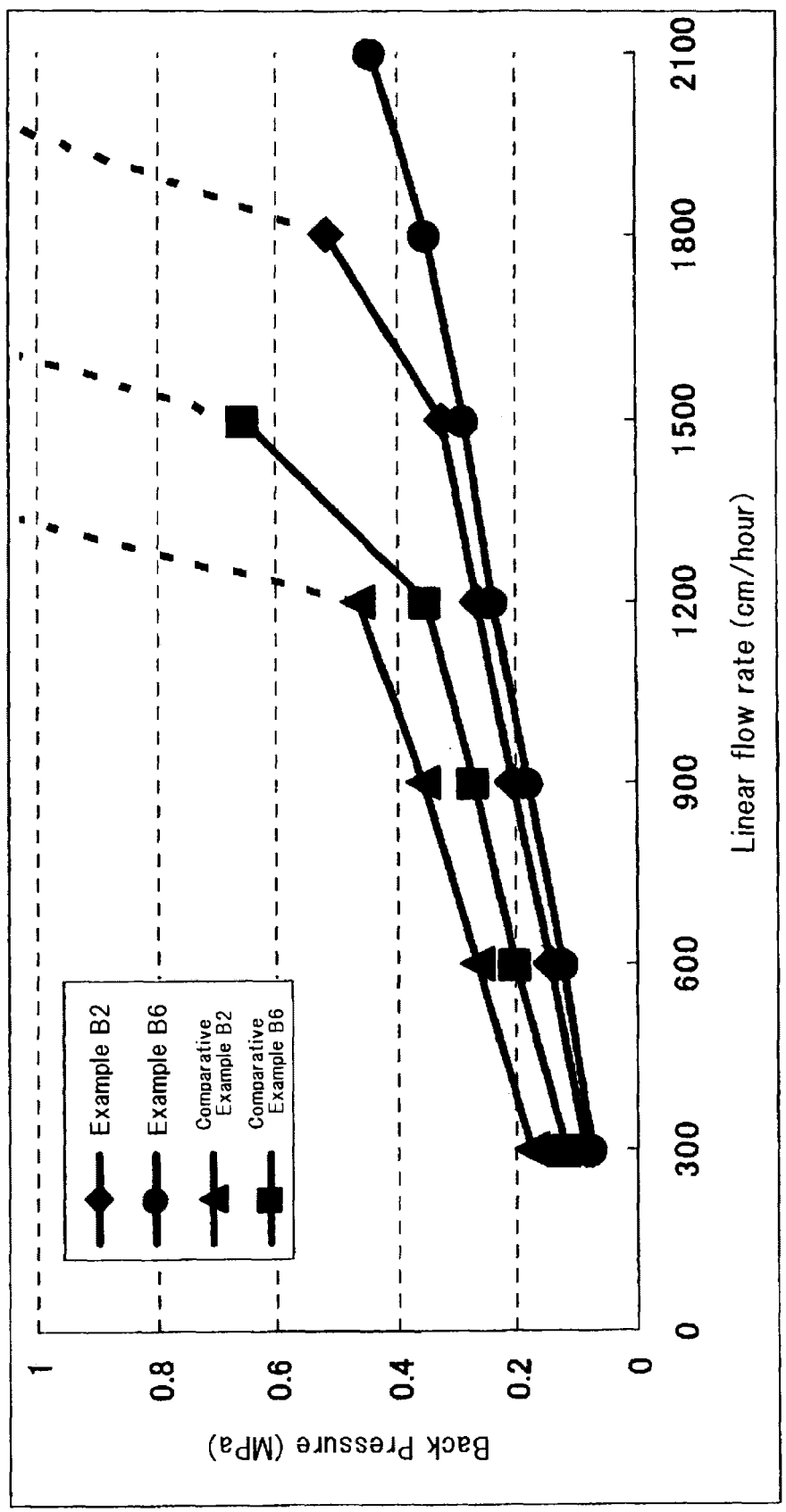

METHOD FOR PRODUCING POLYMER PARTICLES, AND POLYMER PARTICLES

FIELD OF THE INVENTION

The present invention relates to a method for producing polymer particles, and polymer particles prepared thereby. More particularly, the present invention relates to a method for producing polysaccharide composite particles, the polysaccharide composite particles, a method for producing crosslinked polymer particles, and the crosslinked polymer particles.

BACKGROUND OF THE INVENTION

In recent years, in the field of biopharmaceuticals represented by, for example, antibody drugs, technologies for expression of target substances such as proteins are rapidly developed. Accordingly, improvement of productivity in the purification processes, based on chromatography etc., has been desired.

In order to carry out purification of biopolymers such as proteins with high efficiency, carriers for chromatography require high pressure resistance which enables use of the carrier at high flow rates, and require high binding capacity for biopolymers in the case where ligands are contained. Conventionally, as carriers for chromatography, for example, inorganic materials such as silica; synthetic polymers such as poly(meth)acrylic esters and poly(meth)acrylamides; natural polymers such as polysaccharides have been used.

Silica particles and synthetic polymer particles have high strength, and are therefore preferable for use at high flow rates. However, those particles usually exhibit low binding capacity to biopolymers when ligands are introduced, and the particles also cannot exhibit preferable resistance to alkaline solutions which are used for washing the carriers. Furthermore, since synthetic polymer particles are generally hydrophobic to a certain extent, these particles sometimes exhibit non-specific interactions, and consequently cause contamination of impurities.

As for natural polymers, polysaccharides such as agarose and cellulose are usually used. For example, agarose can be dissolved in water at a high temperature, and when the solution is subsequently cooled to a certain temperature (gelling point), a porous gel is formed therefrom. Therefore, agarose gel particles can be produced by dispersing an aqueous phase containing dissolved agarose in an organic solvent to form liquid droplets, and then cooling the dispersion to a temperature lower than or equal to the gelling point.

Furthermore, regarding cellulose, some methods for dissolving and regenerating cellulose to produce porous gel particles, for example, a method comprising dissolving cellulose in an aqueous solution of calcium thiocyanate (Patent Document 1), a method comprising dissolving cellulose in a lithium chloride solution of dimethylacetamide or N-methylpyrrolidone (Patent Document 2), a method comprising dissolving cellulose in an ionic liquid (Non-Patent Document 1), have been reported.

Since such polysaccharide gel particles contain a large number of hydroxyl groups in the molecule, their surfaces are highly hydrophilic. Therefore, those gel particles basically do not cause non-specific interactions with biological materials, and as a result, target molecules may be obtained in high degree of purity. Furthermore, in general, when compared with carriers prepared from silica or a synthetic polymer, the polysaccharide gel particles exhibit an excellent binding capacity for biological molecules, and excellent resistance to alkaline solutions which are generally used for washing filler for chromatography.

However, when polysaccharide gel particles are used as a carrier of filler for chromatography, the polysaccharide gel particles generally have lower mechanical strength as compared with silica particles or synthetic polymer particles. As a result, if the polysaccharide gel particles are used at a high flow rate, the particles are deformed within the column, causing loss of flow channels, and consequently, compaction which causes a limitless increase in the back pressure of the column will easily occur. Thus, the polysaccharide gel particles have a problem of poor resistance to flow rate.

As described above, various materials for chromatographic carriers have their unique defects.

In recent years, a number of means for overcoming those defects have been proposed. For example, a means for improvement of alkali resistance by coating the surface of silica with a hydrophobic siloxane compound (Patent Document 7), a method comprising a step of forming particles from a monomer ester having a bulky, highly hydrophobic aliphatic substituent and a step of modifying surface of the particle with a bis- or polyepoxide compound under alkaline conditions to provide hydrophilicity thereto (Patent Document 8), have been reported.

On the other hand, in regard to natural polymers, the most general method of increasing the mechanical strength and resistance to flow rate of polysaccharide gel particles involves crosslinking of the polysaccharide gel particles after particle formation. Such crosslinking is formed between hydroxyl groups inside the polysaccharide gel particles, and is generally performed by using a crosslinking agent such as epichlorohydrin. Regarding the formation of crosslinking, various methods for improvement have been hitherto reported, and for example, it has been reported that the crosslinking agarose gel particles with a bifunctional or polyfunctional crosslinking agent having a chain length of 6 to 12 atoms and then crosslinking the product with a bifunctional crosslinking agent having a chain length of 2 to 5 atoms to improve mechanical strength of crosslinked agarose gel particles (Patent Document 3); and that introducing dextran to the surface of crosslinked agarose particles, and further allowing the product to react with vinyl sulfonate for the introduction of a cation exchange group to obtain cation-exchange particles having an enhanced binding capacity (Patent Document 9).

Furthermore, it has been reported that crosslinking cellulose gel particles by using a crosslinking agent in which hydroxyl groups are present between functional groups to obtain a porous carrier having appropriate compressive stress (Patent Document 4); that sequentially introducing a crosslinking agent and an alkali solution to a suspension liquid containing cellulose gel particles to obtain cellulose gel particles having superior resistance to flow rate as compared with the case of introducing the entire amount of a crosslinking agent all at once (Patent Document 5); and the like.

Also, as a method of more efficiently crosslinking the interior of particles, there is a method of introducing in advance functional groups to a polysaccharide used as a raw material, subsequently forming particles, subsequently activating the functional groups, and thereby crosslinking the polysaccharide chains. According to this method, as compared with the method of performing crosslinking after the formation of particles, crosslinking can be implemented even inside a fine structure where it is difficult for a crosslinking agent to penetrate therein, so that it is therefore expected to obtain higher mechanical strength. For example, it is described in Patent Document 6 that when agarose is allowed to react with the epoxy group of allyl glycidyl ether to form gel particles, subsequently the allyl group of allyl glycidyl ether is activated and crosslinked with polysaccharide, the mechanical strength of crosslinked agarose gel particles can be improved. However, the technology requires multiple stages of reaction processes ranging from modification of agarose to crosslinking, and thus the operation is complicated. Furthermore, since the reaction between agarose and the epoxy group of allyl glycidyl ether is carried out in water, there is a defect that inactivation of the epoxy group may be caused by water in the reaction system, and the reaction efficiency is decreased.

As such, there are a number of technologies that may be utilized in the production of filler for chromatography which use polymer particles as carriers; however, a technology for producing a chromatographic carrier which achieves a good balance between high binding capacity for materials to be purified, and high pressure resistant performance that enables processing at a high flow rate, has not yet been sufficiently established. Along with the growth of the biopharmaceutical market in recent years, there is a rapidly increasing demand for high speed processing in the purification processes for target substances. In this technical field, there is a strong demand for a method for producing a filler for chromatography which exhibits both higher resistance to flow rate and higher binding capacity.

CITATION LIST

Patent Documents

Patent Document 1: JP 3601229 B1
Patent Document 2: JP 3663666 B1
Patent Document 3: JP 60-39558 A
Patent Document 4: JP 2008-279366 A
Patent Document 5: JP 2009-242770 A
Patent Document 6: JP 4081143 B1
Patent Document 7: JP 2010-52986 A
Patent Document 8: WO 2006/132333 A
Patent Document 9: JP 2009-506340 W
Non-Patent Document 1: J. Chromatogr. A 1217 (2010), 1298-1304

SUMMARY OF THE INVENTION

Problems to be Solved by the Invention

An object of the present invention is to provide polymer particles which, when used as a filler for chromatography, can be used at a high flow rate, that is, has excellent resistance to flow rate that is appropriate for processing in large quantities, and which, when an appropriate ligand is introduced, also exhibits high binding capacity for a target molecule such as a protein, and a method for producing the polymer particles; and more specifically, to provide crosslinked polymer particles and a method for producing the crosslinked polymer particles, polysaccharide composite particles and a method for producing the polysaccharide composite particles, a filler for chromatography which uses the polymer particles, an adsorbent for antibody purification, and the like.

Means for Solving the Problems

The inventors of the present invention have intensively researched, and as a result, the inventors found that the problems described above can be solved by using a method of subjecting a polymer dissolved in an ionic liquid to droplet dispersion in an organic solvent having low compatibility with the ionic liquid, specifically, by employing a method of (A) dissolving two or more kinds of polysaccharides in an ionic liquid, subjecting this solution to droplet dispersion in an organic solvent having low compatibility with the solution, and then coagulating the polysaccharides as composite particles; or (B) allowing a polymer dissolved in an ionic liquid to react with a crosslinking agent while dispersing the polymer as droplet in an organic solvent having low compatibility with the ionic liquid.

Accordingly, the present invention is related to the following items 1) to 20).

1) A method for producing polysaccharide composite particles, the method including the following steps (1) to (3):
(1) a step of preparing a polysaccharide solution, in which two or more kinds of polysaccharides are dissolved in an ionic liquid;
(2) a step of preparing a droplet dispersion liquid of the polysaccharide solution, in which liquid droplets of the polysaccharide solution are dispersed in an organic solvent having low compatibility with the ionic liquid; and
(3) a coagulation step in which a composite of the polysaccharides are coagulated and thereby the polysaccharide composite particles are obtained.

2) The method of the item 1), wherein the polysaccharides are two or more selected from the group consisting of cellulose, agarose, pullulan, and dextran.

3) The method of the above 1) or 2), wherein at least one of the polysaccharides is cellulose.

4) The method of the above 1) to 3), wherein the ionic liquid is an alkylimidazolium salt.

5) The method of the above 1) to 4), wherein the ionic liquid is 1-ethyl-3-methylimidazolium acetate, 1-butyl-3-methylimidazolium chloride, or a mixture thereof.

6) The method of the above 1) to 5), wherein in the step (2), the droplet dispersion of the polysaccharide solution is carried out by mixing a solution which contains the organic solvent having low compatibility with the ionic liquid and an oleophilic polymer with the polysaccharide solution.

7) A polysaccharide composite particle produced according to the method of the above 1) to 6).

8) The polysaccharide composite particle of the above 7), wherein when the particles are packed in a column having an inner diameter of 0.5 cm to a height of 20.0 cm, the linear flow rate at a column pressure of 0.4 MPa when water at 25° C. is allowed to flow through, is 1600 cm/hour to 6000 cm/hour.

9) A filler for chromatography containing the polysaccharide composite particles of the above 7) or 8).

10) An adsorbent for antibody purification, comprising the polysaccharide composite particles of the above 7) or 8).

11) The adsorbent for antibody purification of the above 10), wherein Protein A is contained therein as an affinity ligand.

12) A method for producing a crosslinked polymer particle, the method including a step of allowing a polymer dissolved in an ionic liquid to react with a crosslinking agent, while subjecting the solution to droplet dispersion in an organic solvent having low compatibility with the ionic liquid.

13) The method of the above 12), further including a step of adding, to the dispersion liquid, a medium which is compatible with the ionic liquid but does not substantially dissolve the polymer, to coagulate liquid droplets.

14) The method of the above 12) or 13), wherein the polymer is one or more members selected from polysaccharides and derivatives thereof.

15) The method of the above 14), wherein the polysaccharides are one or more members selected from the group consisting of cellulose, agarose, chitosan, dextran, pullulan, and derivatives thereof.

16) The method of the above 15), wherein the polysaccharides include at least cellulose or a derivative thereof.

17) The method of the above 12) to 16), wherein the crosslinking agent is one or more members selected from halohydrins, bisepoxides, polyepoxides, and divinylsulfone.

18) A crosslinked polymer particle produced by the method of the above 12) to 17).

19) The crosslinked polymer particle of the above 18), wherein the linear flow rate at a column pressure of 0.4 MPa, when the crosslinked polymer particles are packed in a column having an inner diameter of 0.5 cm to a height of 20.0 cm and water at 25° C. is allowed to flow through, is 1600 cm/hour to 6000 cm/hour.

20) A filler for chromatography comprising the crosslinked polymer particles of the above 18) or 19).

21) An adsorbent for antibody purification, comprising the crosslinked polymer particle of the above 18) or 19).

22) The adsorbent for antibody purification of the above 21), wherein Protein A is contained therein as an affinity ligand.

Advantageous Effects of Invention

According to the present invention, a method for producing polymer particles (polysaccharide composite particles and crosslinked polymer particles) which have a large adsorption capacity to proteins and the like when a ligand or the like is introduced, and can be used as chromatographic particles at a high flow rate, a polymer particles, a filler for chromatography, and an adsorbent for antibody purification can be provided.

Therefore, productivity in the purification processes for biopharmaceuticals and the like can be remarkably increased.

BRIEF DESCRIPTION OF THE DRAWINGS

FIG. 1 is a graph illustrating the resistance to flow rate of polymer particles.

DETAILED DESCRIPTION OF THE INVENTION

In the present specification, the expression "A to B" that indicates a numerical value range has the same definition as "more than or equal to A, and less than or equal to B", and includes A and B in the numerical value range.

According to the present invention, the "ionic liquid" is not particularly limited as long as it is an ionic liquid capable of uniformly dissolving the polymer or polysaccharides of the present invention, which are used as raw materials. Herein, an example of being "capable of uniformly dissolving the polymer or polysaccharides" may be a case in which the polymer or polysaccharides are mixed with the ionic liquid in an amount that gives a 3 mass % solution, and dissolution can be visually confirmed. If dissolution is carried out as described above, the temperature does not matter; however, in view of suppressing thermal decomposition of cellulose, it is preferable to dissolve the polymer or polysaccharides at a temperature of 150° C. or lower.

Such an ionic liquid is composed of a cationic component and an anionic component, and an ionic liquid having a melting point of 200° C. or lower is preferred, an ionic liquid having a melting point of 100° C. or lower is more preferred, while an ionic liquid having a melting point of 50° C. or lower is even more preferred. Furthermore, the lower limit of the melting point is not limited, but the melting point is preferably −100° C. or higher, and more preferably −30° C. or higher.

Examples of the cation component include an alkyl- or alkenylimidazolium cation, an alkyl- or alkenylpyridinium cation, an alkyl- or alkenylammonium cation, an alkyl- or alkenylphosphonium cation, an alkyl- or alkenylsulfonium cation, an N,N-dialkylpyrrolidinium cation, an N,N-dialkylpiperidinium cation, and an N,N-dialkylmorpholinium cation. Among these, suitable examples include an alkylimidazolium cation, an alkylpyridinium cation, and an alkylammonium cation. Hereinafter, the term "alkyl" may be a linear or branched alkyl group having 1 to 12 carbon atoms, and among others, a linear alkyl group having 1 to 8 carbon atoms is preferred, while a linear alkyl group having 1 to 5 carbon atoms, such as a methyl group, an ethyl group, an n-propyl group, an n-butyl group or an n-pentyl group, is particularly suitable. Furthermore, the "alkenyl" is preferably an alkenyl group having 2 to 8 carbon atoms, and more preferably an allyl group.

Specific examples of the cationic component include N-methylimidazolium cation, N-ethylimidazolium cation, 1,3-dimethylimidazolium cation, 1,3-diethylimidazolium cation, 1-ethyl-3-methylimidazolium cation, 1-propyl-3-methylimidazolium cation, 1-butyl-3-methylimidazolium cation, 1-hexyl-3-methylimidazolium cation, 1,2,3-trimethylimidazolium cation, and 1,2,3,4-tetramethylimidazolium cation; 1-allyl-3-methylimidazolium cation; N-propylpyridinium cation, N-butylpyridinium cation, 1,4-dimethylpyridinium cation, 1-butyl-4-methylpyridinium cation, and 1-butyl-2,4-dimethylpyridinium cation; trimethylammonium cation, ethyldimethylammonium cation, diethylmethylammonium cation, triethylammonium cation, tetramethylammonium cation, and triethylmethylammonium cation, tetraethylammonium cation. Among these, dialkylimidazolium cations such as 1,3-dimethylimidazolium cation, 1,3-diethylimidazolium cation, 1-ethyl-3-methylimidazolium cation, 1-propyl-3-methylimidazolium cation, 1-butyl-3-methylimidazolium cation, and 1-hexyl-3-methylimidazolium cation are more preferred, and 1-ethyl-3-methylimidazolium cation and 1-butyl-3-methylimidazolium cation are even more preferred.

Examples of the anionic component include halide ions ($Cl^-$, $Br^-$, $I^-$, and the like), carboxylic acid anions (for example, $C_2H_5CO_2^-$, $CH_3CO_2^-$ and $HCO_2^-$ having 1 to 3 carbon atoms in total, and the like), pseudohalide ions (for example, $CN^-$, $SCN^-$, $OCN^-$, $ONC^-$, and $N_3^-$, which are monovalent and have characteristics similar to those of halides), sulfonic acid anions, organic sulfonic acid anions (methanesulfonic acid anion and the like), phosphoric acid anions (ethylphosphoric acid anion, methylphosphoric acid anion, hexafluorophosphoric acid anion, and the like), boric acid anions (tetrafluoroboric acid anion, and the like), and perchloric acid anions, while halide ions and carboxylic acid anions are preferred.

Regarding the ionic liquid of the present invention include, from the viewpoints of the solubility of polysaccharides, melting point, viscosity and the like, suitable examples include an alkylimidazolium salt and a dialkylimidazolium salt. More suitable examples include alkylimidazolium acetate and alkylimidazolium chloride, even more suitable examples include dialkylimidazolium acetate and dialkylimidazolium chloride, and still more suitable examples include 1-ethyl-3-methylimidazolium acetate and 1-butyl-3-methylimidazolium chloride.

According to the present invention, regarding the "polysaccharides", their origins are not particularly limited, and any of natural polysaccharides and synthetic polysaccharides may be used.

Specific examples thereof include cellulose, agarose, chitin, chitosan, dextran, pullulan, starch, guar gum, carrageenan, alginic acid, gum arabic, arabinogalactan, pectin, locust bean gum, Tara gum, tamarind seed gum, psyllium seed gum, acacia gum, glucomannan, xanthan gum, gellan gum, curdlan, inulin, and cyclodextrin. Among these, suitable polysaccharides include cellulose, agarose, pullulan, and dextran.

Meanwhile, as long as being soluble in an ionic liquid, a polysaccharide in which functional groups have been partially introduced can also be used, and examples of such a derivative include a derivative in which a portion of hydroxyl groups of a polysaccharide have been esterified (an ester derivative), and a derivative in which hydroxyl groups of a polysaccharide have been etherified (an ether derivative). Specific examples in the case of cellulose include, for example, cellulose acetate, cellulose propionate, nitrocellulose, cellulose phosphate, cellulose acetate butyrate, cellulose nitrate, methyl cellulose, ethyl cellulose, benzyl cellulose, trityl cellulose, cyanoethyl cellulose, carboxymethyl cellulose, carboxyethyl cellulose, aminoethyl cellulose, and oxyethyl cellulose.

According to the present invention, the "organic solvent having low compatibility with an ionic liquid" (hereinafter, may be simply referred to as "organic solvent") means an organic solvent in which, when an ionic liquid and an organic solvent are mixed at a volume ratio of 1:1, an interface is formed between the ionic liquid and the organic solvent.

The organic solvent used herein serves as a dispersing medium, and as long as the organic solvent has low compatibility with the ionic liquid, the kind of the organic solvent is not limited. Examples thereof include aliphatic hydrocarbons such as n-hexane, n-heptane, and liquid paraffin; alicyclic hydrocarbons such as cyclohexane, methylcyclohxane, cycloheptane, and methylcycloheptane; and aromatic hydrocarbons such as benzene, toluene, xylene, and dichlorobenzene. Those may be used alone, or in combination of two or more. Preferred examples are aromatic hydrocarbons, and more preferred is toluene.

According to the present invention, the "surfactant" that is used in the droplet dispersion process is an organic compound which has an action of reducing the surface tension and has both a hydrophobic moiety and a hydrophilic moiety in the molecule. The surfactant is not particularly limited as long as being capable of dispersing the polymer solution while stably maintaining a liquid droplet state.

Examples of the surfactant include anionic surfactants such as known sodium fatty acids, potassium fatty acids, sodium alkylbenzenesulfonates, alkyl sulfuric acid ester sodium, alkyl ether sulfuric acid ester sodium, sodium alpha-olefin sulfonates, and sodium alkylsulfonates;

amphoteric surfactants such as sodium alkyl amino fatty acids, alkyl betaines, and alkyl amine oxides; and nonionic surfactants such as sucrose fatty acid esters, sorbitan fatty acid esters, polyoxyethylene sorbitan fatty acid esters, polyoxyethylene alkyl esters, fatty acid alkanolamides, polyoxyethylene alkyl ethers, polyoxyethylene alkyl phenyl ethers, polyoxyethylene propylene alkyl ethers, and polyoxyethylene propylene fatty acid esters.

Among these, nonionic surfactants are preferred, and particularly preferred surfactants are sorbitan monooleate (SPAN80) and sorbitan trioleate (SPAN85).

Similarly, the "oleophilic polymer" used in the droplet dispersion process is not particularly limited as long as the polymer can disperse the polymer solution of the present invention while stably maintaining the liquid droplet state; however, it is preferable to use a known oleophilic polymer as a thickening agent, which dissolves in the organic solvent and thereby increases the viscosity. Examples of such a thickening agent include polysaccharide derivatives such as cellulose derivatives, oleophilic vinyl derivatives, and oleophilic acrylic acid-based polymers.

Specific examples of the cellulose derivatives include methyl cellulose, ethyl cellulose, cellulose acetate, carboxymethyl cellulose, and hydroxyethyl cellulose; specific examples of the oleophilic vinyl derivatives include polyvinyl acetate and polyvinyl chloride; and specific examples of the oleophilic acrylic acid-based polymers include an ethyl acrylate-methyl methacrylate-chlorotrimethylammoniumethyl methacrylate copolymer, and a methyl methacrylate-ethyl acrylate copolymer.

Among these, cellulose derivatives are preferred, and particularly ethyl cellulose is preferred.

The oleophilic polymers described above may be used alone, or in combination of two or more.

Hereinafter, the method for producing polysaccharide composite particles and the method for producing crosslinked polymer particles of the present invention will be described in view of the respective steps.

(A) Method for producing polysaccharide composite particles

The method for producing polysaccharide composite particles of the present invention includes (1) a step of preparing a polysaccharide solution, in which two or more kinds of polysaccharides are dissolved in an ionic liquid; (2) a step of preparing a droplet dispersion liquid of the polysaccharide solution, in which droplets of the polysaccharide solution is dispersed in an organic solvent having low compatibility with the ionic liquid; and (3) a coagulation step in which a composite of the polysaccharides are coagulated and thereby the polysaccharide composite particles are obtained.

(1) Step of Preparing Polysaccharide Solution

The method for producing polysaccharide composite particles of the present invention includes a process for preparing a polysaccharide solution, in which two or more kinds of polysaccharides are dissolved in an ionic liquid.

In the present process, raw material polysaccharides (polysaccharides that are used as raw materials; hereinafter, may be simply referred to as "polysaccharides") are dissolved in an ionic liquid, and thus a polysaccharide solution is prepared. The polysaccharides are preferably insoluble in the organic solvent mentioned above, or slightly soluble in the organic solvent. The slightly soluble in an organic solvent means that the mass (g) of the polysaccharide that dissolves in 100 g of the organic solvent at room temperature (25° C.) is 1 g or less.

Examples of the polysaccharides that may be used in the present invention include those described above, and two or more kinds thereof may be selected and used. Suitable examples of the polysaccharides include cellulose, agarose, pullulan, and dextran, and it is preferable that at least one of the polysaccharides is cellulose.

The mixing ratio of the two or more kinds of polysaccharides is not particularly limited, but it is preferable that the smallest portion of a saccharide species be 0.5% or more relative to the total weight of the saccharides.

Furthermore, in the case where cellulose is included, the content of cellulose is preferably 50 or more, more preferably 20% or more, and even more preferably 50% or more, relative to the total weight of the saccharides.

The ionic liquid that is used herein is as described above, and although there may be variation depending on the kinds of the polysaccharides and the ionic liquid used, the dissolution of the raw material polysaccharides in the ionic liquid is preferably carried out usually at 10° C. to 250° C., and suitably 25° C. to 120° C., for about 1 to 24 hours, under stirring.

Herein, from the viewpoint of prevention of difficulties in the formation of liquid droplets caused by an increase in the viscosity of the solution, and of multiple occurrences of fine particles at the time of forming liquid droplets, due to decrease of the polymer concentration, it is preferable that the ionic liquid be used such that the total polysaccharide concentration in the solution is 3% to 50% by mass, and preferably 6% to 30% by mass.

Furthermore, the pore diameter of the polysaccharide particles thus obtainable varies depending on the dissolved concentration of the raw material polysaccharides in the ionic liquid. Specifically, as the dissolved concentration of the raw material polysaccharides is higher, the pore diameter of the polysaccharide particles tends to be smaller. Therefore, polysaccharide particles having any arbitrary pore diameter can be obtained by adjusting the total polysaccharide concentration to be in the range described above. Furthermore, the pore diameter for the polysaccharide particles of the present invention is not particularly limited, generally in the case where the polysaccharide particles are used as a filler for chromatography, the pore diameter is preferably about several nanometers (nm) to several micrometers (μm).

(2) Step of Preparing Droplet Dispersion Liquid of Polysaccharide Solution

The method for producing polysaccharide composite particles of the present invention includes a process for preparing a droplet dispersion liquid of the polysaccharide solution, in which liquid droplets of the polysaccharide solution are dispersed in an organic solvent having low compatibility with the ionic liquid.

In the present process, the polysaccharide solution prepared as described above is dispersed in an organic solvent having low compatibility with the ionic liquid (hereinafter, may be simply referred to as "organic solvent"), and thereby a droplet dispersion liquid of the polysaccharide solution is prepared.

Herein, the "organic solvent having low compatibility with the ionic liquid" is as described above. The amount of use thereof may be appropriately determined in consideration of, for example, the particle size of the polysaccharide particles, and the amount is preferably 50 parts to 2,000 parts by mass, and more preferably 50 parts to 500 parts by mass, relative to 100 parts by mass of the ionic liquid.

The method of droplet dispersing the polysaccharide solution in an organic solvent is not particularly limited, for example, the method may be carried out by mixing under stirring the polysaccharide solution and the organic solvent, together with a surfactant and/or an oleophilic polymer.

The surfactant and the oleophilic polymer used herein is as described above. The amount of use may be appropriately selected in consideration of the dispersion performance in the polysaccharides or the nature of the ionic liquid, and for example, preferably 1 part by mass to 100 parts by mass, and more preferably 1 part by mass to 25 parts by mass, relative to 100 parts by mass of the organic solvent.

The order of mixing of the polysaccharide solution, the organic solvent, and the surfactant and/or oleophilic polymer is not particularly limited, it is preferable to mix a mixed liquid of the organic solvent and the surfactant and/or oleophilic polymer, into the polysaccharide solution.

The method for forming liquid droplets may be carried out by a known method, such as by using a stirring machine such as a static mixer. The particle size of the polysaccharides may be controlled by the speed of rotation at the time of stirring. Specifically, the diameter of the liquid droplets thus formed becomes smaller as the speed of rotation is higher; therefore, the speed of rotation of the mixing machine may be appropriately regulated in accordance with the intended particle size. The temperature at the time of the formation of liquid droplets may be any temperature as long as the polysaccharides are not decomposed and do not precipitate out, the temperature is preferably room temperature to 100° C.

(3) Step of Coagulating Polysaccharide Composite Particles

The method for producing polysaccharide composite particles of the present invention includes a coagulation step of coagulating a composite of the polysaccharides and thereby obtaining the polysaccharide composite particles.

The term "a composite of the polysaccharides" means a polysaccharide containing a mixture of the two or more kinds of polysaccharides, and the "polysaccharide composite particles" mean particles containing the two or more kinds of polysaccharides.

In the present process, polysaccharide composite particles are coagulated from a droplet dispersion liquid of the polysaccharide solution, and an example of such a method may be a method of bringing the droplet dispersion liquid of the polysaccharide solution into contact with a medium which is compatible with the ionic liquid but does not substantially dissolve the polysaccharides.

The "medium which is compatible with the ionic liquid but does not substantially dissolve the polysaccharides" herein means that the medium is uniformly miscible when mixed with the ionic liquid at a volume ratio of 1:1 at normal temperature, and the mass of the polymer that dissolves in 100 g of the medium at normal temperature is 1 g or less. Such a medium may be, for example, one or more kinds of polar solvents such as water, methanol, and ethanol.

The medium may be added directly to the droplet dispersion liquid of the polysaccharide solution, a method in which the polysaccharide composite can be coagulated while the shape of the liquid droplets of the polysaccharide solution is maintained, is preferred. Specifically, a method of mixing under stirring the organic solvent having low compatibility with the ionic liquid, and a medium such as water, methanol or ethanol to prepare a dispersion liquid of the medium, and then bringing the dispersion liquid into contact with the droplet dispersion liquid of the polysaccharide solution, may be used. The organic solvent used at this time is preferably of the same kind as the dispersing medium of the polysaccharide solution, and may contain a surfactant and/or an oleophilic polymer for the formation of liquid droplets.

The amount of use of the medium is preferably 20 parts to 2,000 parts by mass, and more preferably 50 parts to 200 parts by mass, relative to 100 parts by mass of the ionic liquid.

The contact between the droplet dispersion liquid of the polysaccharide solution and the medium is preferably carried out at 0° C. to 100° C., and more preferably at 25° C. to 80° C.

The polysaccharide composite particles thus coagulated can be collected by performing solid-liquid separation by a known method such as centrifugation, filtration, or decantation. Furthermore, the polysaccharide composite particles thus collected are purified by washing with a solvent that is compatible with the ionic liquid and the aforementioned organic solvent, for example, ethanol, isopropanol or butanol, and subsequently washing with water.

Thus, according to the method of the present invention, particles formed from two or more kinds of polysaccharides can be stably produced. Furthermore, the particle size can be arbitrarily adjusted as described above, the mean volume diameter is preferably adjusted to 20 μm to 300 μm, and more preferably 30 μm to 150 μm, from the consideration of an increase in pressure that may occur at a high flow rate and a decrease in the protein binding capacity, in the case where the particles are used as a chromatographic carrier.

As will be described in the Examples given below, when the polysaccharide composite particles of the present invention are packed in a container as a chromatographic carrier, and liquid is passed through at an appropriate linear rate, the dynamic binding capacity for affinity substances of the polysaccharide composite particles is not easily decreased as compared with the case where cellulose particles are used (Test Example A1).

(B) Method for Producing Crosslinked Polymer Particles

The method for producing crosslinked polymer particles of the present invention includes allowing a polymer dissolved in an ionic liquid to react with a crosslinking agent while subjecting the polymer to droplet dispersion in an organic solvent having low compatibility with the ionic liquid, and separating particles thus formed.

According to the present invention, the raw material polymer (polymer that is used as a raw material; hereinafter, may be simply referred to as "polymer") is not particularly limited, a polymer which is insoluble in the organic solvent mentioned above or is slightly soluble in the organic solvent, is preferred. Being slightly soluble in an organic solvent means that the mass (g) of the polymer that dissolves in 100 g of the organic solvent at room temperature (25° C.) is 1 g or less.

Suitable examples of the polymer include polysaccharides, and water-soluble linear organic polymers having properties similar to the polysaccharides, such as polyvinyl alcohol, polyethyleneimine, and polyvinylamine.

The polysaccharides described above may be used alone or in combination of two or more. Suitable examples of the polysaccharides include cellulose, agarose, chitosan, dextran, and pullulan. Among them, from the viewpoints of high binding capacity for biopolymers and low non-specific absorptivity, it is preferable to use cellulose and agarose as main components, and from the viewpoint of pressure resistance, it is more preferable to use cellulose as a main component.

The raw material polymer is dissolved in an ionic liquid, and thus an ionic liquid solution of the polymer is prepared.

The ionic liquid that is used herein is as described above, and the dissolution of the raw material polymer in the ionic liquid may be regulated depending on the kinds of the polysaccharides and the ionic liquid used. Preferably the dissolution is carried out usually at 10° C. to 250° C., and suitably 25° C. to 120° C., for about 1 to 24 hours, under stirring.

Herein, from the viewpoint of prevention of difficulties in the formation of liquid droplets due to an increase in the viscosity of the solution, and of multiple occurrences of fine particles at the time of forming liquid droplets due to a decrease of the polymer concentration, it is preferable that the ionic liquid be used such that the total polymer concentration in the solution is 3% to 50% by mass, and preferably 6% to 30% by mass.

Furthermore, the pore diameter of the particles thus obtainable varies depending on the dissolved concentration of the raw material polymer in the ionic liquid. Specifically, as the dissolved concentration of the polymer is higher, the pore diameter of the particles tends to be smaller. Therefore, particles having any arbitrary pore diameter can be obtained by adjusting the total polymer concentration to be in the range described above. Furthermore, the pore diameter for the crosslinked polymer particles of the present invention is not particularly limited, generally in the case where the crosslinked polymer particles are used as a filler for chromatography, the pore diameter is preferably about several nanometers (nm) to several micrometers (μm).

The ionic liquid solution of the polymer prepared as described above is added to an organic solvent having low compatibility with the ionic liquid (hereinafter, may be simply referred to as "organic solvent"), and is suspended and dispersed therein. At this time, the polymer is allowed to react with the crosslinking agent.

Herein, the "organic solvent having low compatibility with the ionic liquid" is as described above. The amount of use of the organic solvent may be appropriately determined in consideration of, for example, the particle size of the polymer particles, the amount of use is preferably 50 parts to 2,000 parts by mass, and more preferably 50 parts to 500 parts by mass, relative to 100 parts by mass of the ionic liquid.

The crosslinking agent that is used in the present reaction is not particularly limited as long as it contains a functional group capable of reacting with the raw material polymer, and examples thereof include halohydrins such as epichlorohydrin; bisepoxides such as ethylene glycol diglycidyl ether, diethylene glycol diglycidyl ether, polyethylene glycol diglycidyl ether, polypropylene glycol diglycidyl ether, and neopentyl glycol diglycidyl ether; polyepoxides such as glycerol polyglycidyl ether, diglycerol polyglycidyl ether, sorbitol polyglycidyl ether, and trimethylolpropane polyglycidyl ether; and divinylsulfone. These crosslinking agents may be used alone or in combination of two or more.

The amount of use of the crosslinking agent is 0.5% to 500% by mass, and preferably 1% to 200% by mass, based on the polymer, from the viewpoint of improvement of the particle performance without causing any deficiency in the particle formation.

In regard to such a crosslinking agent, the method for addition thereof is not particularly limited as long as the crosslinking agent does not cause any deficiency in the reaction with the polymer, and for example, the crosslinking agent may be added in advance to the ionic liquid solution of the polymer, or may be added after the ionic liquid solution of the polymer is mixed with the organic solvent. Furthermore, in order to promote the progress of the reaction, a catalyst may also be added together with the crosslinking agent. The catalyst is not particularly limited, and any one of general organic acids, inorganic acids, organic bases and inorganic bases may be used.

According to the present invention, the crosslinking reaction is carried out while the ionic liquid solution of the polymer is dispersed in the organic solvent. Specifically, in the method of the present invention, the formation of crosslinking between the polymer molecules proceeds within liquid droplets, and particles are simultaneously formed. Therefore, in regard to the crosslinking forming reaction, the conditions are not limited as long as the process of droplet dispersion is not interrupted, the reaction may be carried out by mixing and stirring at a temperature at which the polymer is not decomposed or precipitated out and the crosslinking reaction proceeds, for example, at room temperature to 110° C., and preferably 50° C. to 100° C., for approximately 1 hour to 48 hours, and preferably 4 hours to 24 hours.

Regarding the method of dispersion (liquid droplet formation), any known method may be used, such as the use of a stirring machine such as a static mixer. The diameter of the liquid droplets can be controlled by the speed of rotation at the time of stirring, and consequently, the particle size of the particles thus produced can be controlled. Specifically, the diameter of the liquid droplets thus formed becomes smaller as the speed of rotation is higher; therefore, the speed of rotation of the mixing machine may be appropriately regulated in accordance with the intended particle size.

Furthermore, in order to increase the dispersion efficiency, it is preferable to add a surfactant and/or an oleophilic polymer to the ionic liquid and/or the organic solvent. The surfactant that is used herein is an organic compound which reduces the surface tension and has both a hydrophobic moiety and a hydrophilic moiety in the molecule, and the surfactant is not particularly limited as long as it is capable of dispersing the ionic liquid solution of the polymer while stably maintaining the liquid droplet state.

The surfactant and the oleophilic polymer that are used herein are as described above. The amount of use thereof may be appropriately selected in consideration of the dispersion performance or the nature of the ionic liquid, for example, the amount of use is preferably 1 part by mass to 100 parts by mass, and more preferably 1 part by mass to 25 parts by mass, relative to 100 parts by mass of the organic solvent.

In the case of using a surfactant and/or an oleophilic polymer, the order of mixing of the ionic liquid solution of the polymer, the organic solvent, and the surfactant and/or oleophilic polymer is not particularly limited, it is preferable to mix a mixed liquid of the organic solvent and the surfactant and/or oleophilic polymer, into the ionic liquid solution of the polymer.

Thus, crosslinking between the polymer molecules proceeds in the course of the formation of liquid droplets. When the degree of crosslinking is increased, firm particles are produced within the liquid droplets. Therefore, as the particles are directly subjected to solid-liquid separation by a known method such as centrifugation, filtration or decantation, crosslinked polymer particles can be separated and collected.

On the other hand, if the degree of crosslinking is decreased, since the polymer maintains fluidity in the liquid droplets, crosslinked polymer particles can be obtained by coagulating the liquid droplets by bringing the liquid droplets into contact with a medium which is compatible with the ionic liquid and does not substantially dissolve the polymer.

Herein, the "medium which is compatible with the ionic liquid and does not substantially dissolve the polymer" means that the medium is uniformly miscible when mixed with the ionic liquid at a volume ratio of 1:1 at normal temperature, and the mass of the polymer that dissolves in 100 g of the medium at normal temperature is 1 g or less. Such a medium may be, for example, one or more polar solvents such as water, methanol, and ethanol.

The medium may be added to the droplet dispersion liquid described above, a method in which the crosslinked polymer can be coagulated while the shape of the liquid droplets is maintained, is preferred. Specifically, a method of mixing under stirring the organic solvent having low compatibility with the ionic liquid, the medium such as water, methanol or ethanol, and optionally a surfactant or an oleophilic polymer, to prepare a dispersion liquid of the medium, and then bringing the dispersion liquid into contact with the droplet dispersion liquid, may be used. The organic solvent used at this time is preferably the same as the dispersing medium of the polymer solution.

The amount of use of the medium is preferably 20 parts to 2,000 parts by mass, and more preferably 50 parts to 200 parts by mass, relative to 100 parts by mass of the ionic liquid.

Furthermore, the contact between the droplet dispersion liquid and the medium is preferably carried out at 0° C. to 100° C., and suitably at 25° C. to 80° C.

The crosslinked polymer particles thus prepared can be collected by subjecting the particles to solid-liquid separation by a known method such as centrifugation, filtration, or decantation. Furthermore, the collected particles are purified by washing with a solvent which is compatible with the ionic liquid and the organic solvent, for example, ethanol, isopropanol or butanol, and then performing washing with water.

In regard to the mean volume diameter of the crosslinked polymer particles obtainable by the method of the present invention, the mean volume diameter is preferably adjusted to 20 µm to 300 µm, and more preferably 30 µm to 150 µm from the consideration of an increase in pressure that may occur at a high flow rate and a decrease in the binding capacity for the substances to be purified, such as proteins, in the case where the particles are used as a chromatographic carrier.

Thus, according to the method of the present invention, since crosslinking formation proceeds in the course of the process in which the polymer is subjected to droplet dispersion, highly rigid particles in which the interior of the particles is efficiently crosslinked can be produced. As a result, crosslinked polymer particles having excellent resistance to flow rate, through which the mobile phase can be passed at a high flow rate, can be produced (Test Example B1 described below). Furthermore, when the crosslinked polymer particles are used as a carrier for a filler for chromatography, the crosslinked polymer particles have a high dynamic binding capacity for affinity substances, as compared with the case of using polymer particles that are produced by a general method which does not use a crosslinking agent (Test Example B2 described below).

Thus, the polymer particles obtained by the methods (A) and (B) of the present invention may be further subjected to chemical crosslinking using known methods (see, for example, U.S. Pat. No. 4,973,683 and JP-A-2009-242770). By performing chemical crosslinking, the particles acquire higher rigidity and enhanced resistance to flow rate, and may be used at a higher flow rate. The crosslinking agent is not particularly limited as long as it contains a functional group which reacts with the hydroxyl group of the raw material polymer, and examples thereof include halohydrins such as epichlorohydrin; bisepoxides such as ethylene glycol diglycidyl ether, diethylene glycol diglycidyl ether, polyethylene glycol diglycidyl ether, polypropylene glycol diglycidyl ether, and neopentyl glycol diglycidyl ether; polyepoxides such as glycerol polyglycidyl ether, diglycerol polyglycidyl ether, sorbitol polyglycidyl ether, and trimethylolpropane polyglycidyl ether; and divinylsulfone. These crosslinking agents may be used alone or in combination of two or more.

Since the polymer particles of the present invention have properties such as described above, the polymer particles may be suitably used as various fillers (carriers) for affinity chromatography, ion exchange chromatography, chelate chromatography, hydrophobic interaction chromatography, and gel permeation chromatography, or as a polymer carrier, a carrier for bioreactors, a carrier for test drugs, a carrier for body fluid purification, a cosmetic additive, or the like.

The polymer particles of the present invention may be characterized, when used as a filler for chromatography, by its linear flow rate at a column pressure of 0.4 MPa obtainable when the polymer particles are packed in a column having an inner diameter of 0.5 cm to a height of 20.0 cm and water at 25° C. is allowed to flow through. Specifically, the polymer particles of the present invention are such that the linear flow rate at a column pressure of 0.4 MPa obtainable when the polymer particles are packed in a column having an inner diameter of 0.5 cm to a height of 20.0 cm and water at 25° C. is allowed to flow through, is preferably 1,600 cm/hour to 6,000 cm/hour. This linear rate is more preferably 1,650 cm/hour to 5,950 cm/hour, and even more preferably 1,700 cm/hour to 5,900 cm/hour.

In the case of using the polymer particles of the present invention as a chromatographic filler, depending on the purpose, a ligand (for example, an antigen or a protein having high specificity to an antibody, Protein A, Protein G or a variant thereof, or a peptide having antibody-binding activity), a charged group, a hydrophobic group or the like may be contained in the polymer particles of the present invention using known methods.

For example, an embodiment which a filler for chromatography suitable for antibody purification, in another word, an adsorbent for antibody purification, may be obtained by immobilizing Protein A using known methods (U.S. Pat. No. 6,399,750 etc.) to the polymer particles of the present invention via at least a part of the hydroxyl groups of the polymer particles.

EXAMPLES

Hereinafter, the present invention will be more specifically described by way of Examples. Furthermore, the following descriptions illustrate embodiments of the present invention in a general manner, and the present invention is not intended to be particularly limited to such embodiments.

1. Evaluation Methods 1.1. Measurement of Particle Size Distribution

The particle size distribution was measured with a laser scattering diffraction type particle size distribution analyzer, LS 13 320 (Beckman Coulter, Inc.). For optical models, Fluid R.I. Real 1.333 and Sample R.I. Real 1.54 Imaginary 0 were used. Thereby, the mean volume diameter of cellulose particles, and the coefficient of variation of the mean volume diameter (C.V. value: (Standard deviation/mean volume diameter)×100) were determined.

1.2. Particle Sedimentation Volume

Particles were dispersed in water, the dispersion was poured into a graduated container, and the particle sedimentation volume after standing for 12 hours was measured by visual inspection.

1.3. Measurement of Resistance to Flow Rate

The particles obtained in Examples and Comparative Examples described below were respectively packed in glass columns (manufactured by GE Healthcare Corp.; TRICORN 5/200 column) having an inner diameter of 0.5 cm, to a bed height of 20 cm. Each of the columns was mounted on a chromatographic system (manufactured by GE Healthcare Corp.; AKTA Prime), pure water at 25° C. was allowed to flow therethrough, and the pressure difference between the column inlet and the column outlet obtained at that time was designated as the column pressure.

1.4. Measurement of Binding Capacity

The binding capacity of the particles obtained in each of the Examples and Comparative Examples described below was evaluated as the dynamic binding capacity for human polyclonal IgG in the Protein A-bound state. Specifically, Protein A-bound particles obtained in Examples and Comparative Examples described below were respectively packed in glass columns (manufactured by GE Healthcare Corp.; TRICORN 5/200 column) having an inner diameter of 0.5 cm, to a bed height of 20 cm. Each of the columns was mounted on a chromatographic system (manufactured by GE Healthcare Corp.; AKTA prime), and the column was equilibrated with a 20 mM phosphate buffer (pH 7.4). Subsequently, a 20 mM phosphate buffer (pH 7.4) containing human polyclonal IgG (5 mg/ml) was allowed to flow through the column at a linear flow rate of 300 cm/hour, and the dynamic binding capacity was determined from the amount of human polyclonal IgG adsorption, measured by monitoring the absorbance, at the time when the human polyclonal IgG concentration in the eluent reached a 10% breakthrough, and the packing material volume. Furthermore, the back pressure at the time of the measurement described above was measured.

Example A1

Production of Cellulose/agarose Composite Particles

In a 500-ml baffled separable flask, 4.04 g of a cellulose powder (manufactured by Funakoshi Corp.) and 0.13 g of an agarose powder (manufactured by Shimizu Shokuhin Co., Ltd.) were added to 60 g of 1-ethyl-3-methylimidazolium acetate (manufactured by Sigma-Aldrich Co.), and the flask was placed in a warm water bath and was heated to 95° C. The mixture was dissolved by performing stirring for 2 hours, and thus a polysaccharide solution was obtained. In another 500-ml separable flask, 16 g of ethyl cellulose 45 (manufactured by Wako Pure Chemical Industries, Ltd.) was added to 200 ml of toluene, and the flask was placed in a warm water bath. The mixture was dissolved by performing stirring for 2 hours at 80° C. Furthermore, in still another separable flask, 12 g of ethyl cellulose 45 was added to 150 ml of toluene, and the flask was placed in a warm water bath. The mixture was dissolved by performing stirring for 2 hours at 80° C., and then 62.5 ml of a 0.2 M aqueous solution of sodium sulfate was added thereto. The mixture was stirred at 400 rpm for 30 minutes at 80° C., and thus a W/O type emulsion was obtained. Subsequently, the ethyl cellulose 45-containing toluene was added to the polysaccharide solution, and the mixture was stirred at 400 rpm for 10 minutes at 90° C., to prepare an IL/O type emulsion (wherein IL means ionic liquid). Subsequently, the W/O type emulsion obtained as described above was added to the IL/O type emulsion, and while the mixture was stirred at 400 rpm, the mixture was cooled to room temperature. Thereafter, the mixture was poured into 1500 ml of ethanol, and after being stirred, the mixture was left to stand. The supernatant was removed by decantation. Furthermore, decantation was carried out two times with 1500 ml of ethanol, and then the residue was subjected to filtration and washing with ethanol, and then subjected to filtration and washing with water. Thus, titled cellulose/agarose composite particles were obtained. Subsequently, the cellulose/agarose composite particles were screened with sieves having pore sizes of 106 μm and 45 μm. Thus, particles having a particle size of 45 μm to 106 μm were obtained. The particles were analyzed with an optical microscope, and the average particle size was 89 μm. The amount of particles thus obtained was 50 ml as the sedimentation volume.

Furthermore, in regard to the particle sedimentation volume, particles were dispersed in water, the dispersion was poured into a graduated container, and the particle sedimentation volume after standing for 12 hours was measured by visual inspection (and likewise hereinafter).

Example A2

Production of Cellulose/pullulan Composite Particles

Cellulose/pullulan composite particles were obtained in the same manner as in Example 1, except that a pullulan powder (manufactured by Hayashibara Biochemical Laboratories, Inc.) was used instead of the agarose powder used in Example 1. The particles were analyzed with an optical microscope, and the average particle size was 92 μm. The amount of particles thus obtained was 50 ml as the sedimentation volume.

Example A3

Production of Cellulose/dextran Composite Particles [1]

Cellulose/dextran composite particles were obtained in the same manner as in Example 1, except that instead of 4.04 g of the cellulose powder (manufactured by Funakoshi Corp.) and 0.13 g of the agarose powder (manufactured by Shimizu Shokuhin Co., Ltd.) used in Example 1, 5.14 g of the cellulose powder and 0.64 g of dextran 40000 (manufactured by Wako Pure Chemical Industries, Ltd.) were used. The particles were analyzed with an optical microscope, and the average particle size was 92 μm. The amount of particles thus obtained was 60 ml as the sedimentation volume.

Example A4

Production of Cellulose/dextran Composite Particles [2]

In a 500-ml baffled separable flask, 4.17 g of a cellulose powder and 0.13 g of dextran 40000 (manufactured by Wako Pure Chemical Industries, Ltd.) were added to 60 g of 1-butyl-3-methylimidazolium chloride (manufactured by Sigma-Aldrich Co.), and the flask was placed in a warm water bath and heated to 95° C. The mixture was dissolved by performing stirring for 2 hours, and thus a polysaccharide solution was obtained. In another 500-ml separable flask, 9 ml of Span 85 (manufactured by Wako Pure Chemical Industries, Ltd.) was added to 200 ml of mineral oil (heavy) (manufactured by Sigma-Aldrich Co.), and the flask was placed in a warm water bath. The mixture was dissolved by performing stirring for 2 hours at 80° C. Furthermore, in a still another separable flask, 6.75 ml of Span 85 was added to 150 ml of mineral oil (heavy), and the flask was placed in a warm water bath. The mixture was dissolved by performing stirring for 2 hours at 80° C., and then 62.5 ml of a 0.2 M aqueous solution of sodium sulfate was added thereto. The mixture was stirred at 400 rpm for 30 minutes at 80° C., and thus a W/O type emulsion was obtained. Next, the Span 85-containing mineral oil (heavy) was added to the polysaccharide solution, and the mixture was stirred at 800 rpm for 10 minutes at 100° C., to prepare a droplet dispersion liquid (IL/O type emulsion) of the polysaccharide solution. Subsequently, the W/O type emulsion obtained as described above was added thereto, and while the mixture was stirred at 800 rpm, the mixture was cooled to room temperature. Thereafter, the mixture was poured into 1500 ml of ethanol, and after being stirred, the mixture was left to stand. The supernatant was removed by decantation. Furthermore, decantation was carried out two times with 1500 ml of ethanol, and then the residue was subjected to filtration and washing with ethanol, and then subjected to filtration and washing with water. Thus, titled cellulose/dextran composite particles were obtained. Subsequently, the cellulose/dextran composite particles were screened with sieves having pore sizes of 106 μm and 40 μm. Thus, particles having a particle size of 40 μm to 106 μm were obtained. The particles were analyzed with an optical microscope, and the average particle size was 92 μm. The particle sedimentation volume thus obtained was 10 ml.

Comparative Example A1

Production of Cellulose Particles

Cellulose particles were produced according to the method described in J. Chromatogr. A 1217 (2010) 1298-1304 (Non-Patent Document 1).

Specifically, in a 500-ml baffled separable flask, 4.17 g of a cellulose powder was added to 60 g of 1-butyl-3-methylimidazolium chloride (manufactured by Sigma-Aldrich Co.), and the flask was placed in a warm water bath and heated to 95° C. The mixture was dissolved by performing stirring for 2 hours, and thus a cellulose solution was obtained. In another 500-ml separable flask, 9 ml of Span 85 (manufactured by Wako Pure Chemical Industries, Ltd.) was added to 200 ml of mineral oil (heavy) (manufactured by Sigma-Aldrich Co.), and the flask was placed in a warm water bath. The mixture was dissolved by performing stirring for 2 hours at 80° C. Furthermore, in a still another separable flask, 6.75 ml of Span 85 was added to 150 ml of mineral oil (heavy), and the flask was placed in a warm water bath. The mixture was dissolved by performing stirring for 2 hours at 80° C., and then 62.5 ml of a 0.2 M aqueous solution of sodium sulfate was added thereto. The mixture was stirred at 400 rpm for 30 minutes at 80° C., and thus a W/O type emulsion was obtained. Subsequently, the Span 85-containing mineral oil (heavy) was added to the cellulose solution, and the mixture was stirred at 800 rpm for 10 minutes at 100° C. to prepare a droplet dispersion liquid (IL/O type emulsion) of the cellulose solution. Subsequently, the W/O type emulsion obtained as described above was added thereto, and while the mixture was stirred at 800 rpm, the mixture was cooled to room temperature. Thereafter, the mixture was poured into 1500 ml of ethanol, and after being stirred, the mixture was left to stand. The supernatant was removed by decantation. Furthermore, decantation was carried out two times with 1500 ml of ethanol, and then the residue was subjected to filtration and washing with ethanol, and then subjected to filtration and washing with water. Thus, titled cellulose particles were obtained. Subsequently, the cellulose particles were screened with sieves having pore sizes of 106 μm and 40 μm. Thus, particles having a particle size of 40 μm to 106 μm were obtained. The particles were analyzed with an optical microscope, and the average particle size was 90 μm. The particle sedimentation volume thus obtained was 10 ml.

Example A5

Chemical Crosslinking of Cellulose/agarose Composite Particles and Immobilization of Protein A A 100-ml three-necked flask was used, and 35 ml of water was added to 25 ml (sedimentation volume) of the cellulose/agarose composite particles produced in Example 1 in the flask. Subsequently, 120 mg of $NaBH_4$, 25 ml of a 32 wt % aqueous $Na_2SO_4$ solution, and 0.6 ml of a 45 wt % aqueous NaOH solution were added, and the mixture was stirred. The temperature was adjusted to 50° C., and stirring was continued for 30 minutes. Next, 0.9 ml of 45 wt % NaOH and 0.72 ml of epichlorohydrin were added thereto twelve times at an interval of one hour. After completion of the addition, the mixture was allowed to react for 12 hours at a temperature of 50° C. Thereafter, particles were collected by filtration and washed with pure water, and thus chemically crosslinked cellulose/agarose composite particles were obtained. 5 ml (sedimentation volume) of the particles thus obtained were suction dried, and water was added thereto to obtain a suspension in a total amount of 7 ml. 0.8 ml of a 5 N aqueous solution of sodium hydroxide, 24 mg of $NaBH_4$, and 4 ml of epichlorohydrin were added to the suspension described above, and the mixture was shaken for 8 hours at 25° C. Thus, epoxy groups were introduced into the chemically crosslinked cellulose/agarose composite particles. Thereafter, the reaction liquid described above was subjected to filtration and washing with pure water, ethanol, and pure water in this order. The particles thus obtained were suspended in 45 ml of a 1.5 M sodium sulfate-0.1 M phosphate buffer (pH 6.8) containing 102 mg of Protein A (RepliGen Corp., rPA50). The suspension was shaken for 24 hours at 25° C., and thus Protein A was bound to the particles. Thereafter, the particles were centrifuged, and the supernatant was removed. Subsequently, 45 ml of an aqueous solution (pH 8.3) of 1 M thioglycerol and 0.5 M sodium sulfate was added to the residue, and the mixture was allowed to react for 4 hours at 25° C. to block the remaining epoxy groups, and the particles were sequentially washed with a 0.1 M citrate buffer (pH 3.2), a 0.1 M aqueous solution of sodium hydroxide, and PBS (−). Thus, Protein A-immobilized cellulose agarose composite particles were obtained.

Example A6

Chemical Crosslinking of Cellulose/pullulan Composite Particles and Immobilization of Protein A The cellulose/pullulan compositized particles obtained in Example A2 were treated by the same method as that used in Example A5, and thus Protein A-immobilized cellulose/pullulan composite particles were obtained.

Example A7

Chemical Crosslinking of Cellulose/dextran Composite Particles and Immobilization of Protein A [1]

The cellulose/dextran compositized particles obtained in Example A3 were treated by the same method as that used in Example A5, and thus Protein A-immobilized cellulose/dextran compositized particles were obtained.

Example A8

Chemical Crosslinking of Cellulose/dextran Composite Particles and Immobilization of Protein A [2]

The cellulose/dextran compositized particles obtained in Example A4 were treated by the same method as that used in Example A5, and thus Protein A-immobilized cellulose/dextran compositized particles were obtained.

Comparative Example A2

Chemical Crosslinking of Cellulose Particles and Immobilization of Protein A

The cellulose particles obtained in Comparative Example A1 were treated by the same method as that used in Example A5 to immobilize Protein A thereto, and thus Protein A-immobilized cellulose particles were obtained.

Test Example A1

Measurement of Immunoglobulin G (IgG) Dynamic Binding Capacity and Pressure

The Protein A-immobilized polysaccharide particles obtained in Examples A5, A6, A7 and A8, and Comparative Example A2 were respectively packed in columns having an inner diameter of 0.5 cm to a bed height of 20.0 cm. Each of the columns was equilibrated with a 20 mM phosphate buffer (pH 7.4), and then a 20 mM phosphate buffer (pH 7.4) containing human polyclonal IgG (5 mg/ml) was passed through the column at a linear flow rate of 300 cm/hour. The dynamic binding capacity was determined from the amount of human polyclonal IgG adsorption, measured by monitoring the absorbance, at the time when the human polyclonal IgG concentration in the eluent reached a 10% breakthrough, and the packing material volume. Furthermore, the column pressure at that time was measured. The results are presented in Table 1. The product of the present invention showed low column pressure, and high IgG dynamic binding capacity per volume.

TABLE 1

| Packing material | IgG dynamic binding capacity (mg/ml) | Column pressure (MPa) |
| --- | --- | --- |
| Example A5 | 46 | 0.11 |
| Example A6 | 50 | 0.08 |
| Example A7 | 49 | 0.08 |
| Example A8 | 41 | 0.13 |
| Comparative Example A2 | 37 | 0.18 |

Example B1

Production of Crosslinked Polymer Particles (1)

In a 500-ml separable flask, 3.86 g of a cellulose powder (manufactured by Funakoshi corp.) was added to 60 g of 1-ethyl-3-methylimidazolium acetate (manufactured by Sigma-Aldrich Co.), and the flask was placed in a warm water bath and was heated to 95° C. The mixture was dissolved by performing stirring for 2 hours, and thus a cellulose solution was obtained. In another 500-ml separable flask, 16 g of ethyl cellulose 45 (manufactured by Wako Pure Chemical Industries, Ltd.) was added to 200 ml of toluene (manufactured by Wako Pure Chemical Industries, Ltd.), and the flask was placed in a warm water bath. The mixture was dissolved by performing stirring for 2 hours at 80° C., and thus ethyl cellulose-containing toluene was obtained. Furthermore, in a still another separable flask, 12 g of ethyl cellulose 45 was added to 150 ml of toluene, and the flask was placed in a warm water bath. The mixture was dissolved by performing stirring for 2 hours at 80° C., and then 62.5 ml of a 0.2 M aqueous solution of sodium sulfate was added thereto. The mixture was stirred at 400 rpm for 30 minutes at 80° C., and thus a W/O type emulsion was obtained. Subsequently, 0.4 g of glycerol polyglycidyl ether (product name: EPIOL G-100, manufactured by NOF Corp.) was added to the cellulose solution, and the ethyl cellulose 45-containing toluene was added thereto. The mixture was stirred at 300 rpm for 4 hours at 90° C. To this suspension, the W/O type emulsion was added, and while the mixture was stirred at 300 rpm, the mixture was cooled to room temperature. Thereafter, the mixture was poured into 1500 ml of ethanol, and after the mixture was stirred and left to stand, the supernatant was removed by decantation. Furthermore, decantation was carried out two times with 1500 ml of ethanol, and then the residue was subjected to filtration and washing with ethanol and pure water. The product was further classified by sieving in a water bath, and thus particles were obtained in a sedimentation volume of 50 ml. The mean volume diameter of the particles thus obtained was 64 µm, and the C.V. value was 41%.

Example B2

25 ml (sedimentation volume) of the particles obtained in Example B1 were suspended in 25 ml of pure water, and 40 ml of a 32 wt % aqueous solution of sodium sulfate was added thereto. While being stirred, 1 ml of a 45% aqueous solution of sodium hydroxide and 200 mg of $NaBH_4$ were added thereto, and the mixture was heated to 50° C. While stirring was continued at 50° C., 1.5 ml of a 45 wt % aqueous solution of sodium hydroxide and 1.2 ml of epichlorohydrin (manufactured by Wako Pure Chemical Industries, Ltd.) were added for 12 times in total at an interval of one hour. Stirring was continued for another 12 hours. Thereafter, the suspension was cooled and then was subjected to filtration and washing with pure water, ethanol, and pure water in this order. The product was further classified by sieving in a water bath, and particles were obtained in a sedimentation volume of 25 ml. The mean volume diameter of the particles thus obtained was 62 µm, and the C.V. value was 40%.

Example B3

5 ml (sedimentation volume) of the particles obtained in Example B2 were suction dried, and water was added to the particles to obtain a suspension in a total volume of 7 ml. To this suspension, 0.8 ml of a 5 M aqueous solution of sodium hydroxide, 24 mg of $NaBH_4$, and 4 ml of epichlorohydrin (manufactured by Wako Pure Chemical Industries, Ltd.) were added, and the mixture was shaken for 8 hours at 25° C. Thereafter, the reaction liquid described above was subjected to filtration and washing with pure water, ethanol, and pure water in this order, and thus particles were obtained in a sedimentation volume of 5 ml.

Example B4

5 ml (sedimentation volume) of the particles obtained in Example B3 were suspended in 45 ml of a 1.5 M sodium sulfate-0.1 M phosphate buffer (pH 6.8) containing 102 mg of Protein A (product name: rPA50, manufactured by RepliGen Corp.). The suspension was shaken for 24 hours at 25° C. and then was centrifuged, and the supernatant was removed. 45 ml of 1 M thioglycerol and a 0.5 M aqueous solution of sodium sulfate (pH 8.3) was added to the remaining particles, and the mixture was shaken for 4 hours at 25° C. Subsequently, the mixture was washed sequentially with a 0.1 M citrate buffer (pH 3.2), a 0.1 M aqueous solution of sodium hydroxide, and PBS (−), and thus particles were obtained in a sedimentation volume of 5 ml.

Example B5

Particles were produced according to the method of Example B1, except that a mixture of two kinds of polysaccharides, namely, cellulose and pullulan, was used as the raw material. Specifically, in a 500-ml separable flask, 3.86 g of a cellulose powder (manufactured by Funakoshi Corp.) and 0.39 g of pullulan (manufactured by Hayashibara Biochemical Laboratories, Inc.) were added to 60 g of 1-ethyl-3-methylimidazolium acetate (manufactured by Sigma-Aldrich Co.), and the flask was placed in a warm water bath and heated to 95° C. The mixture was dissolved by performing stirring for 2 hours, and thus a solution of a mixture of cellulose and pullulan was obtained. In another 500-ml separable flask, 16 g of ethyl cellulose 45 (manufactured by Wako Pure Chemical Industries, Ltd.) was added to 200 ml of toluene (manufactured by Wako Pure Chemical Industries, Ltd.), and the flask was placed in a warm water bath. The mixture was dissolved by performing stirring for 2 hours at 80° C., and thus ethyl cellulose-containing toluene was obtained. Furthermore, in a still another separable flask, 12 g of ethyl cellulose 45 was added to 150 ml of toluene, and the flask was placed in a warm water bath. The mixture was dissolved by performing stirring for 2 hours at 80° C., and then 62.5 ml of a 0.2 M aqueous solution of sodium sulfate was added to the mixture. The mixture was stirred at 400 rpm for 30 minutes at 80° C., and thus a W/O type emulsion was obtained. Subsequently, 0.4 g of glycerol polyglycidyl ether (product name: EPIOL G-100, NOF Corp.) was added to a solution of a mixture of cellulose and pullulan, the ethyl cellulose-containing toluene was further added thereto, and the mixture was stirred at 270 rpm for 4 hours at 90° C. The W/O type emulsion was added to this suspension, and while the mixture was stirred at 270 rpm, the mixture was cooled to room temperature. Thereafter, the mixture was poured into 1500 ml of ethanol, and after the mixture was stirred and left to stand, the supernatant was removed by decantation. Furthermore, decantation was carried out two times with 1500 ml of ethanol, and then the residue was subjected to filtration and washing with ethanol and pure water. The product was further classified by sieving in a water bath, and thus particles were obtained in a sedimentation volume of 50 ml. The mean volume diameter of the particles thus obtained was 65 µm, and the C.V. value was 44%.

Example B6

The particles obtained in Example B5 were used and treated by the same method as the method described in Example B2, and thus particles were obtained in a water sedimentation volume of 25 ml. The mean volume diameter of the particles thus obtained was 65 µm, and the C.V. value was 35%.

Example B7

The particles obtained in Example B6 were used and treated by the same method as the method described in Example B3, and thus particles were obtained in a sedimentation volume of 5 ml.

Example B8

The particles obtained in Example B7 were used and treated by the same method as the method described in Example B4, and thus particles were obtained in a sedimentation volume of 5 ml.

Comparative Example B1

Cellulose particles were produced according to the method described in J. Chromatogr. A 1217 (2010), 1298-1304 (Non-Patent Document 1). Specifically, in a 500-ml separable flask, 4.17 g of a cellulose powder (manufactured by Funakoshi Corp.) was added to 60 g of 1-butyl-3-methylimidazolium chloride (manufactured by Sigma-Aldrich Co.), and the flask was placed in a warm water bath and heated to 95° C. The mixture was dissolved by performing stirring for 2 hours, and thus a cellulose solution was obtained. In another 500-ml separable flask, 9 ml of Span 85 (molecular weight 957) (manufactured by Wako Pure Chemical Industries, Ltd.) was added to 200 ml of mineral oil (heavy) (manufactured by Sigma-Aldrich Co.), and the flask was placed in a warm water bath. The mixture was dissolved by performing stirring for 2 hours at 80° C., and thus Span 85-containing mineral oil (heavy) was obtained. Furthermore, in still another separable flask, 6.75 ml of Span 85 was added to 150 ml of mineral oil (heavy), and the flask was placed in a warm water bath. The mixture was dissolved by performing stirring for 2 hours at 80° C., and then 62.5 ml of a 0.2 M aqueous solution of sodium sulfate was added thereto. The mixture was stirred at 400 rpm for 30 minutes at 80° C., and thus a W/O type emulsion was obtained. Subsequently, the Span 85-containing mineral oil (heavy) was added to the cellulose solution, and the mixture was stirred at 800 rpm for 10 minutes at 100° C. The W/O type emulsion was added to this suspension, and while the mixture was stirred at 800 rpm, the mixture was cooled to room temperature. Thereafter, the mixture was poured into 1500 ml of ethanol, and after the mixture was stirred and left to stand, the supernatant was removed by decantation. Furthermore, decantation was carried out two times with 1500 ml of ethanol, and then the residue was subjected to filtration and washing with ethanol and pure water. The product was further classified by sieving in a water bath, and thus particles were obtained in a water sedimentation volume of 10 ml. This operation was carried out several times, and a necessary amount of particles were obtained. The mean volume diameter of the particles thus obtained was 66 µm, and the C.V. value was 48%.

Comparative Example B2

The particles obtained in Comparative Example B1 were used and treated by the same method as the method described in Example B2, and thus particles were obtained in a water sedimentation volume of 25 ml. The mean volume diameter of the particles thus obtained was 65 µm, and the C.V. value was 47%.

Comparative Example B3

The particles obtained in Comparative Example B2 were used and treated by the same method as the method described in Example B3, and thus particles were obtained in a sedimentation volume of 5 ml.

Comparative Example B4

The particles obtained in Comparative Example B3 were used and treated by the same method as the method described in Example B4, and thus particles were obtained in a sedimentation volume of 5 ml.

Comparative Example B5

Particles were produced according to the method of Example B1, except that the addition of glycerol polyglycidyl ether, which is a crosslinking agent, was eliminated. Specifically, in a 500-ml separable flask, 3.86 g of a cellulose powder (manufactured by Funakoshi Corp.) was added to 60 g of 1-ethyl-3-methylimidazolium acetate (manufactured by Sigma-Aldrich Co.), and the flask was placed in a warm water bath and heated to 95° C. The mixture was dissolved by performing stirring for 2 hours, and thus a cellulose solution was obtained. In another 500-ml separable flask, 16 g of ethyl cellulose 45 (manufactured by Wako Pure Chemical Industries, Ltd.) was added to 200 ml of toluene (manufactured by Wako Pure Chemical Industries, Ltd.), and the flask was placed in a warm water bath. The mixture was dissolved by performing stirring for 2 hours at 80° C., and thus ethyl cellulose-containing toluene was obtained. Furthermore, in still another separable flask, 12 g of ethyl cellulose 45 was added to 150 ml of toluene, and the flask was placed in a warm water bath. The mixture was dissolved by performing stirring for 2 hours at 80° C., and then 62.5 ml of a 0.2 M aqueous solution of sodium sulfate was added thereto. The mixture was stirred at 400 rpm for 30 minutes at 80° C., and thus a W/O type emulsion was obtained. Subsequently, the ethyl cellulose-containing toluene was added to the cellulose solution, and the mixture was stirred at 300 rpm for 10 minutes at 90° C. The W/O type emulsion was added to this suspension, and while the mixture was stirred at 300 rpm, the mixture was cooled to room temperature. Thereafter, the mixture was poured into 1500 ml of ethanol, and after the mixture was stirred and left to stand, the supernatant was removed by decantation. Furthermore, decantation was carried out two times with 1500 ml of ethanol, and then the residue was subjected to filtration and washing with ethanol and pure water. The product was further classified by sieving in a water bath, and thus particles were obtained in a water sedimentation volume of 50 ml. The mean volume diameter of the particles thus obtained was 67 µm, and the C.V. value was 36%.

Comparative Example B6

The particles obtained in Comparative Example B5 were used and treated by the same method as the method described in Example B2, and thus particles were obtained in a water sedimentation volume of 25 ml. The mean volume diameter of the particles thus obtained was 72 µm, and the C.V. value was 34%.

Comparative Example B7

The particles obtained in Comparative Example B6 were used and treated by the same method as the method described in Example B3, and thus particles were obtained in a sedimentation volume of 5 ml.

Comparative Example B8

The particles obtained in Comparative Example B7 were used and treated by the same method as the method described in Example B4, and thus particles were obtained in a sedimentation volume of 5 ml.

Test Example B1

Comparison of Resistance to Flow Rate

According to the method described in section 1.3, the resistance to flow rate of the particles of Example B2, Example B6, Comparative Example B2, and Comparative Example B6 was evaluated. The results are presented in Table 1 and FIG. 1. The particles obtained in Example B2 and Example B6 had lower back pressure at a certain linear flow rate as compared with the particles obtained in the Comparative Examples, and liquid transport at a high linear flow rate, at which compaction occurred with the particles of the Comparative Examples, was enabled. Specifically, the particles of Example B2 and Example B6 exhibited superior resistance to flow rate as compared with the particles of the Comparative Examples.

TABLE 2

|  |  | Back pressure (MPa) | | | |
| --- | --- | --- | --- | --- | --- |
|  |  | Example B2 | Example B6 | Comparative Example B2 | Comparative Example B6 |
| Linear flow rate (cm/hr) | 300 | 0.08 | 0.08 | 0.17 | 0.12 |
|  | 600 | 0.14 | 0.12 | 0.26 | 0.20 |
|  | 900 | 0.21 | 0.18 | 0.36 | 0.27 |
|  | 1200 | 0.27 | 0.24 | 0.46 | 0.35 |
|  | 1500 | 0.33 | 0.29 | >1 | 0.65 |
|  | 1800 | 0.52 | 0.35 | — | >1 |
|  | 2100 | >1 | 0.44 | — | — |

Test Example B2

Comparison of Binding Capacity and Resistance to Flow Rate

According to the method described in section 1.4, the dynamic binding capacity for human polyclonal IgG of the particles of Example B4, Example B8, Comparative Example B4, and Comparative Example B8 was evaluated. The results are presented in Table 2. The particles obtained in Example B4 and Example B8 exhibited large IgG binding capacities per volume and low back pressure, as compared with the particles obtained in the Comparative Examples.

TABLE 3

| Particles | IgG dynamic binding capacity (mg/ml) | Column pressure (MPa) |
| --- | --- | --- |
| Example B4 | 48 | 0.09 |
| Example B8 | 50 | 0.08 |
| Comparative Example B4 | 37 | 0.18 |
| Comparative Example B8 | 42 | 0.12 |

The invention claimed is:

1. A method for producing a polysaccharide composite particle, the method comprising:
   dissolving two or more kinds of polysaccharides in an ionic liquid, thereby preparing a polysaccharide solution;
   dispersing liquid droplets of the polysaccharide solution in an organic solvent having low compatibility with the ionic liquid, thereby preparing a droplet dispersion liquid of the polysaccharide solution; and
   coagulating a composite of the polysaccharides, thereby obtaining the polysaccharide composite particle.

2. The method according to claim 1, wherein the polysaccharides are two or more selected from the group consisting of cellulose, agarose, pullulan, and dextran.

3. The method according to claim 1, wherein at least one of the polysaccharides is cellulose.

4. The method according to claim 1, wherein the ionic liquid is an alkylimidazolium salt.

5. The method according to claim 1, wherein the ionic liquid is 1-ethyl-3-methylimidazolium acetate, 1-butyl-3-methylimidazolium chloride, or a mixture thereof.

6. The method according to claim 1, wherein the dispersing is carried out by mixing a solution comprising the organic solvent and an oleophilic polymer, with the polysaccharide solution.

7. A polysaccharide composite particle produced by the method according to claim 1.

8. The polysaccharide composite particle according to claim 7, wherein a linear flow rate at a column pressure of 0.4 MPa, when polysaccharide composite particles are packed in a column with an inner diameter of 0.5 cm to a height of 20.0 cm and water at 25° C. is allowed to flow through, is from 1600 cm/hour to 6000 cm/hour.

9. A filler; comprising:
   the polysaccharide composite particle according to claim 7,
   wherein the filler is suitable for chromatography.

10. An adsorbent comprising:
    the polysaccharide composite particle according to claim 7,
    wherein the adsorbent is suitable for purifying an antibody.

11. The adsorbent according to claim 10, wherein the adsorbent comprises Protein A as an affinity ligand.

12. A method for producing a crosslinked polymer particle, the method comprising:
    allowing a polymer dissolved in an ionic liquid, thereby reacting with a crosslinking agent while subjecting the polymer to droplet dispersion in an organic solvent having low compatibility with the ionic liquid.

13. The method according to claim 12, further comprising:
    adding a medium to a dispersion liquid,
    wherein the medium is compatible with the ionic liquid and does not substantially dissolve the polymer to coagulate liquid droplets.

14. The method according to claim 12, wherein the polymer is at least one member selected from the group consisting of a polysaccharide and a derivative thereof.

15. The method according to claim 14, wherein the polysaccharide is at least one member selected from the group consisting of cellulose, agarose, chitosan, dextran, pullulan, and a derivative thereof.

16. The method according to claim 15, wherein the polysaccharide comprises at least cellulose or a derivative thereof.

17. The method according to claim 12, wherein the crosslinking agent is at least one member selected from the group consisting of a halohydrin, a bisepoxide, a polyepoxide, and divinylsulfone.

18. A crosslinked polymer particle produced by the method according to claim 12.

19. The crosslinked polymer particle according to claim 18, wherein a linear flow rate at a column pressure of 0.4 MPa, when crosslinked polymer particles are packed in a column with an inner diameter of 0.5 cm to a height of 20.0 cm and water at 25° C. is allowed to flow through, is from 1600 cm/hour to 6000 cm/hour.

20. A filler, comprising:
    the crosslinked polymer particle according to claim 18,
    wherein the filler is suitable for chromatography.

21. An adsorbent, comprising:
    the crosslinked polymer particle according to claim 18,
    wherein the adsorbent is suitable for purifying an antibody.

22. The adsorbent according to claim 21, wherein the adsorbent comprises Protein A as an affinity ligand.

* * * * *